Figure 1:
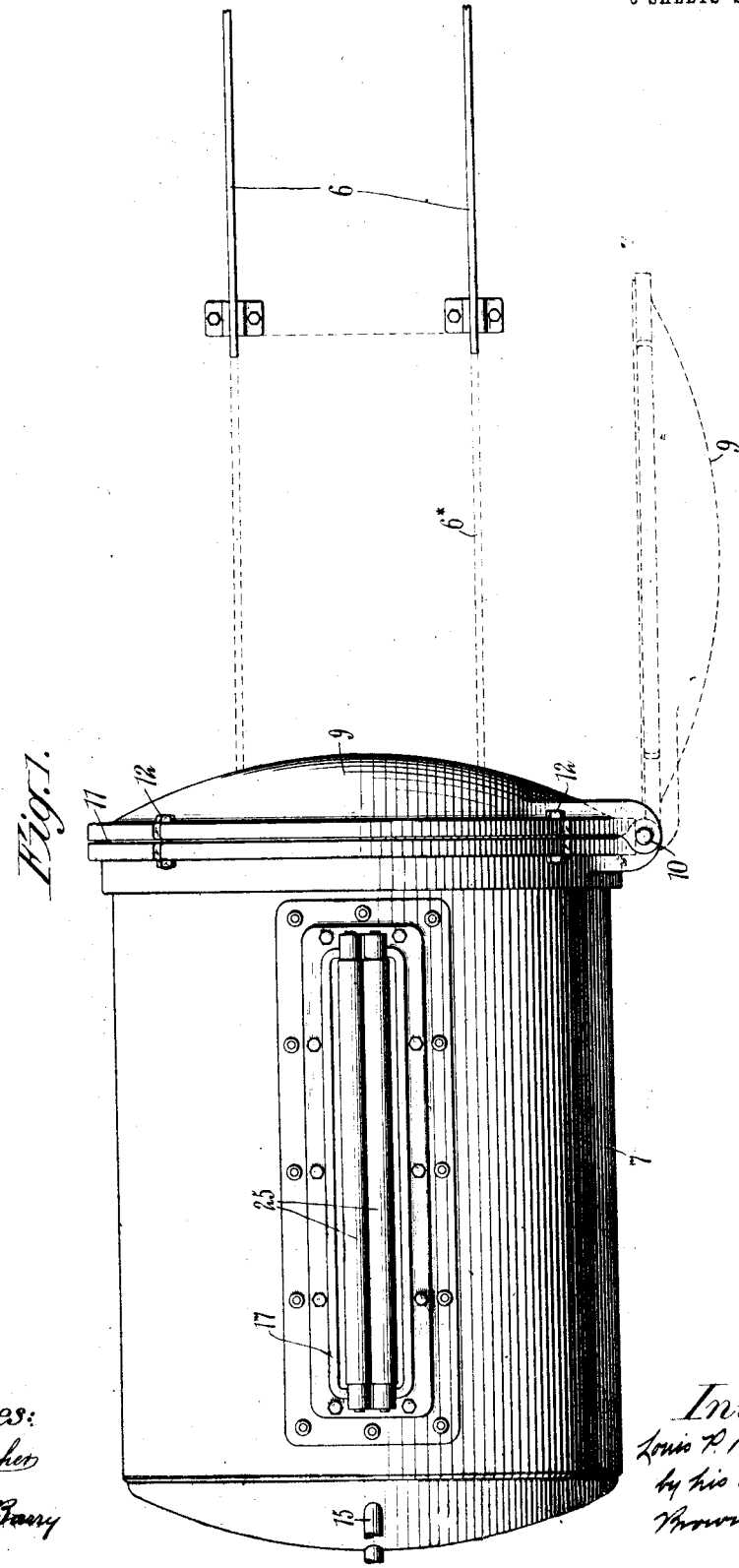

L. P. DESTRIBATS.
APPARATUS FOR IMPREGNATING AND COATING MATERIALS.
APPLICATION FILED JULY 26, 1910.

1,072,705.

Patented Sept. 9, 1913.
3 SHEETS—SHEET 1.

Witnesses:
Inventor:

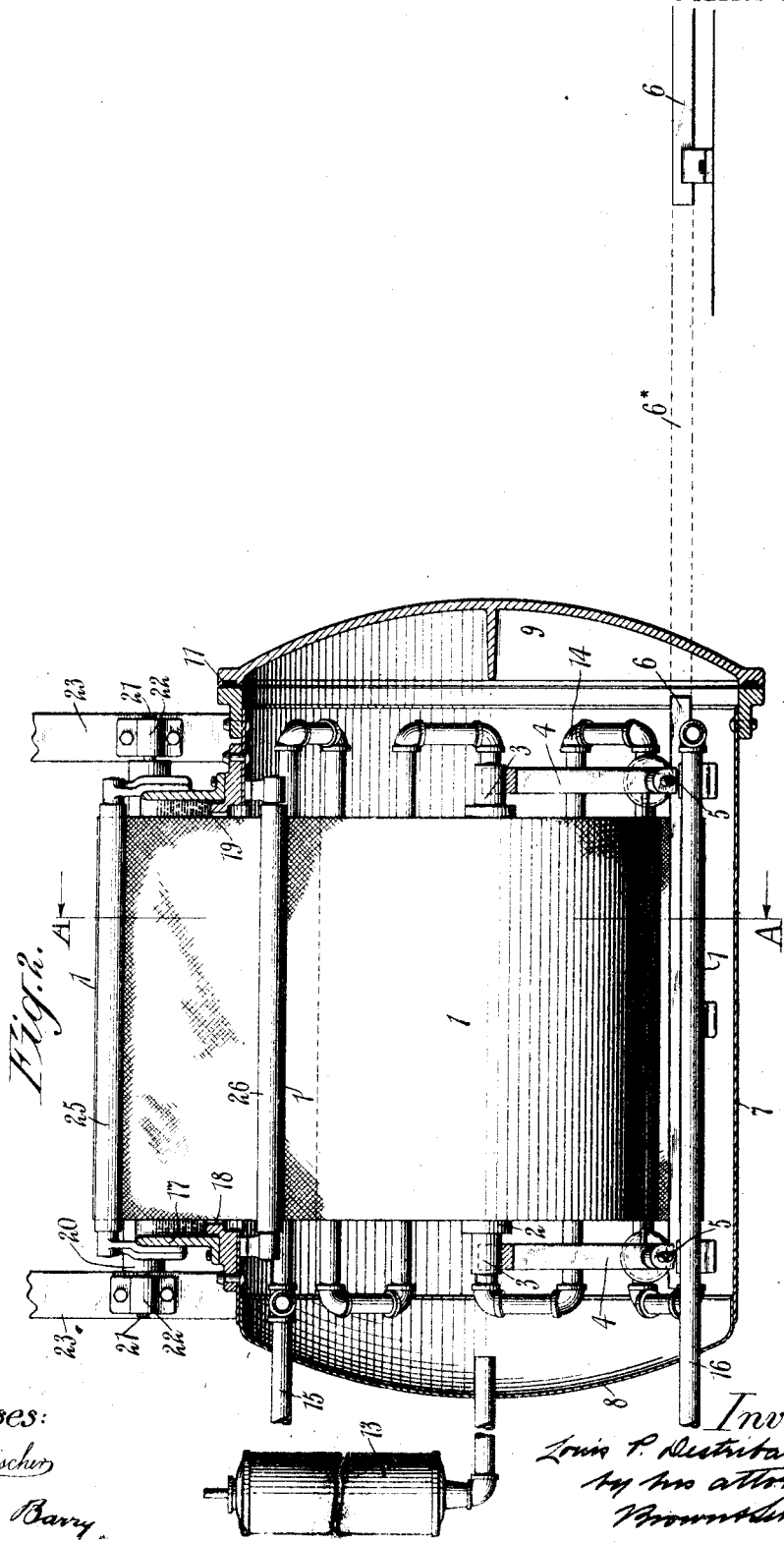

L. P. DESTRIBATS.
APPARATUS FOR IMPREGNATING AND COATING MATERIALS.
APPLICATION FILED JULY 26, 1910.
1,072,705.
Patented Sept. 9, 1913.
3 SHEETS—SHEET 3.
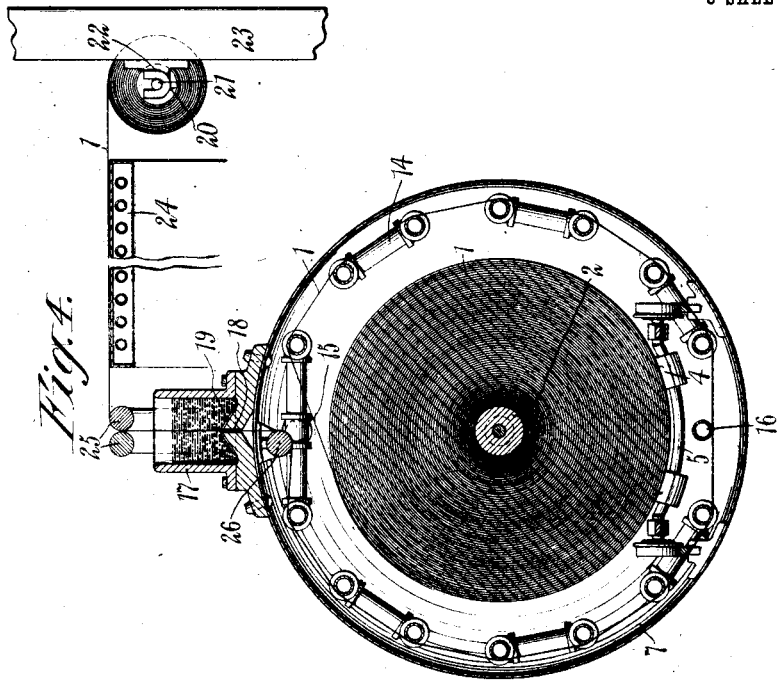
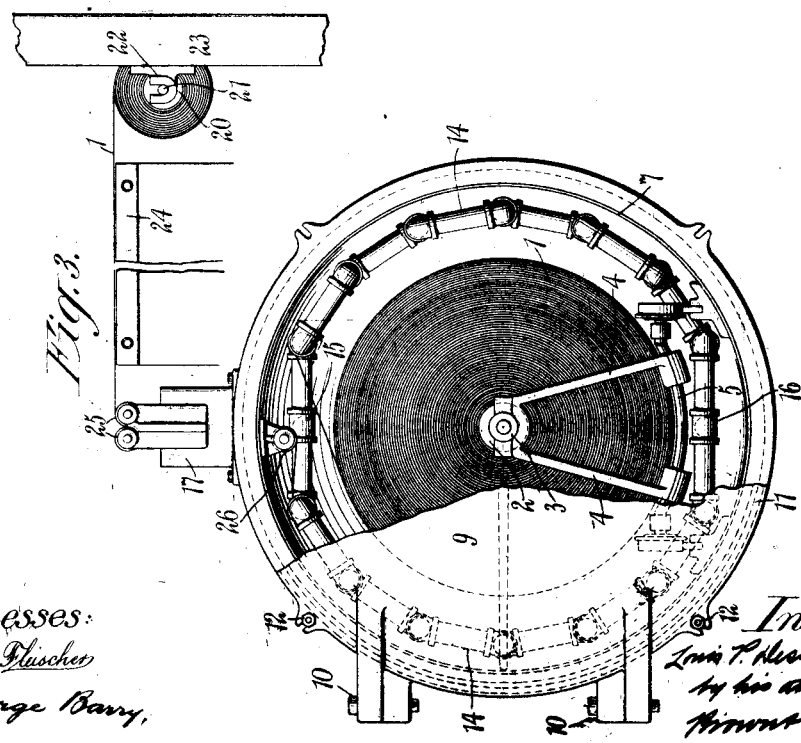
Witnesses:

UNITED STATES PATENT OFFICE.

LOUIS P. DESTRIBATS, OF TRENTON, NEW JERSEY.

APPARATUS FOR IMPREGNATING AND COATING MATERIALS.

1,072,705.

Specification of Letters Patent.

Patented Sept. 9, 1913.

Application filed July 26, 1910. Serial No. 573,832.

*To all whom it may concern:*

Be it known that I, LOUIS P. DESTRIBATS, a citizen of France, and resident of Trenton, in the county of Mercer and State of New Jersey, have invented a new and useful Improvement in Apparatus for Impregnating and Coating Materials, of which the following is a specification.

In impregnating and coating materials, such as fabrics, cords, cables and the like, in the ordinary manner, where air is not exhausted from the material, certain particles of air will remain in the material thus causing bubbles to form therein during the impregnating and coating process, which bubbles, as they burst, expose non-impregnated or coated portions of the material to external atmosphere and thus materially impair the quality and usefulness of the material for the purposes intended.

The object of this present invention is to obviate the above faults by providing means for impregnating and coating the material after the air has been exhausted therefrom and before the material comes in contact with the external atmosphere, the said material being preferably also thoroughly dried while the air is exhausted therefrom.

This invention consists broadly in an apparatus having a vacuum chamber and a liquid container through which the material is passed from the vacuum chamber before reaching external atmosphere.

A practical embodiment of this invention is represented in the accompanying drawings, in which—

Figure 1 represents an apparatus adapted for treating a fabric, in top plan, Fig. 2 is a longitudinal vertical central section through the same, Fig. 3 is an end view, a portion of the door for the vacuum chamber being broken away to more clearly show the parts within the chamber, and Fig. 4 is a transverse section taken in the plane of the line A—A of Fig. 2.

The roll of fabric to be treated is denoted by 1 and its core 2 is provided with suitable trunnions 3 resting upon supports 4 uprising from a wheeled truck 5, the wheels of which are fitted to travel along track sections 6. One of these track sections 6 is located permanently within a vessel 7, which vessel is herein shown as cylindrical in form and disposed horizontally. This vessel 7 when in use, is closed at both ends. In the present instance, the end 8 is shown permanently closed and the other end shown as provided with a door 9 hinged at 10 to the body portion of the vessel 7. This door may be provided with a packing 11 for sealing the door air-tight when closed, bolts 12 or other suitable fastening devices serving to lock the door in its closed position.

The truck bearing the roll of fabric may be moved into and out of the vessel 7 when the door 9 is opened by inserting a removable track section 6*, indicated in dotted lines, between the track sections 6 within and without the vessel 7. This track section 6* is removable to permit the opening and closing of the door 9. The interior of the vessel 7 may have the air exhausted therefrom in any suitable manner, as, for instance, by an air exhausting pump 13 of well known and approved form. An annular series of steam pipes 14 is properly supported within the vessel 7 around the roll of fabric 1, which steam pipes may be provided with the usual steam inlet and outlet pipes 15, 16, extending through the end wall 8 of the vessel. A liquid container 17 is mounted upon the top of the vessel 7, which liquid container is provided with a slot 18 in its bottom, through which slot the fabric is led from within the vessel 7 into the liquid container 17 for engagement with the liquid therein before the fabric comes in contact with external atmosphere. Suitable flaps 19 may be provided in the bottom of the container 17 for engaging the opposite sides of the fabric as it leaves the slot 18 for preventing the liquid within the container 17 from being drawn into the interior of the vessel 7.

The fabric web as it leaves the liquid container 17 may be wound into a roll on a suitable core 20 having trunnions 21 supported by brackets 22 on uprights 23. A suitable heater 24 is located between the liquid container 17 and the winding roll for the purpose of drying the liquid impregnated and coated fabric. The fabric as it leaves the liquid container 17 may also pass through a pair of rolls 25 arranged to lead the fabric web from a roll 26 located within the vessel 7 straight through the slot 18 in the bottom of the liquid container 17. To thoroughly dry the fabric within the vessel 7 the fabric as it leaves the roll is passed around the longitudinally extended branches of the steam pipe within the vessel before being led around the roll 26 and upwardly through the liquid in the container 17.

It will be seen from the above description that by inserting the roll of fabric to be treated into the vessel 7 and then exhausting the air from the said receptacle, that the air is also exhausted from the fabric. At the same time the fabric is also thoroughly dried by the steam pipes hereinabove described or by any other suitable drying apparatus. The fabric is then led through the liquid in the container 17 thus permitting the liquid to thoroughly impregnate the fabric as well as coat the opposite sides thereof before the fabric comes into contact with external atmosphere. This insures the complete impregnation and coating of the fabric and absolutely prevents the formation of air bubbles therein.

It is obvious that various changes may be made in the construction, form and arrangement of the several parts herein shown and described without departing from the spirit and scope of my invention; the gist of the same being to provide a vacuum chamber for extracting the air from the material being treated whether it be a fabric, cord, cable or any other material, which it is desired to treat, and for passing the material through a liquid bath before permitting it to come into contact with external atmosphere, the material being preferably submitted to a drying process before its passage through a liquid bath.

What I claim is:—

1. An apparatus for impregnating and coating materials, comprising a hollow vessel for receiving the material, means for exhausting the air therefrom, a liquid container having a slot in open communication with the interior of said vessel and means for guiding the material from the interior of the vessel through said slot and liquid container before the material reaches external atmosphere.

2. An apparatus for impregnating and coating materials, comprising a hollow vessel for receiving the material, means for exhausting the air therefrom, means for heating the interior of the vessel, a liquid container having a slot in open communication with the interior of said vessel, and means for guiding the material around said heating means and from thence through said slot and liquid container before the material reaches external atmosphere.

3. An apparatus for impregnating and coating materials, comprising a hollow vessel for receiving the material, means for exhausting the air therefrom, a liquid container having a slot in open communication with the interior of said vessel, means for guiding the material from the interior of the vessel through said slot, and liquid container, before the material reaches external atmosphere, and flaps located adjacent to said slot in position to engage the said material.

4. An apparatus for impregnating and coating materials, comprising a hollow vessel for receiving the material, means for exhausting the air therefrom, means for heating the interior of the vessel, a liquid container having a slot in open communication with the interior of said vessel, means for guiding the material around said heating means, and from thence through said slot and liquid container, before the material reaches external atmosphere, and flaps located adjacent to said slot in position to engage said material.

In testimony, that I claim the foregoing as my invention, I have signed my name in presence of two witnesses, this twenty-third day of June 1910.

LOUIS P. DESTRIBATS.

Witnesses:
F. GEORGE BARRY,
OTTO W. HOLMGREN.